United States Patent [19]

Cheng et al.

[11] 4,179,555
[45] Dec. 18, 1979

[54] OIL-FREE ELASTOMERIC POLY(ARYLOXYPHOSPHAZENE) COPOLYMERS

[75] Inventors: Tai C. Cheng, Akron; John W. Fieldhouse, Mogadore; Arthur E. Oberster, Canton; Daniel F. Graves, Clinton, all of Ohio

[73] Assignee: The Firestone Tire & Rubber Company, Akron, Ohio

[21] Appl. No.: 919,888

[22] Filed: Jun. 28, 1978

[51] Int. Cl.[2] .............................................. C08G 79/02
[52] U.S. Cl. ............................... 528/168; 260/30.4 N; 260/33.2 R; 260/33.6 R; 428/379; 521/180
[58] Field of Search .................. 528/399, 168; 521/50, 521/180

[56] References Cited

U.S. PATENT DOCUMENTS

| | | | |
|---|---|---|---|
| 3,419,504 | 12/1968 | Klender | 528/168 |
| 3,702,833 | 11/1972 | Rose et al. | 528/399 |
| 3,970,533 | 7/1976 | Kyker et al. | 528/168 |

Primary Examiner—Morton Foelak

[57] ABSTRACT

Poly(aryloxyphosphazene) copolymers are prepared having randomly repeating units represented by the formula:

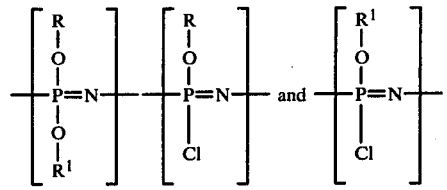

wherein R and R[1] may be the same or different and are selected from the group consisting of monovalent aryl radicals and substituted aryl radicals having the structure:

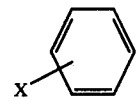

wherein X is a substituent selected from the group consisting of alkyl, alkoxy, aryl, aryloxy, amino and halogen substituted on any sterically permissible position on the phenyl group; and wherein the amount of Cl present in the form of P—Cl bonds is from about 0.4 percent to about 10 percent by weight based upon the total weight of copolymer.

The copolymers may contain minor proportions of randomly distributed units in addition to the repeating units described above, these additional units containing reactive sites enabling the properties of the copolymers to be modified by crosslinking and/or curing.

The copolymers are elastomeric even in the absence of low molecular weight polyphosphazene oils. The copolymers are curable by a variety of curing agents such as sulfur and peroxides, and can also be cured by radiation and ultraviolet light. The copolymers may be utilized in various applications such as foams and coatings, and are particularly suited for use in wire coating formulations.

20 Claims, No Drawings

OIL-FREE ELASTOMERIC POLY(ARYLOXYPHOSPHAZENE) COPOLYMERS

BACKGROUND OF THE INVENTION

This invention relates to oil-free poly(aryloxyphosphazene) copolymers. More particularly, this invention relates to poly(aryloxyphosphazene) copolymers containing residual amounts of P—Cl bonds which produce elastomeric characteristics in the copolymers even in the absence of relatively low molecular weight polyphosphazene oils which are normally required to impart such characteristics.

Various elastomeric poly(aryloxyphosphazene) polymers and copolymers have been previously described in the prior art. Thus, for example, U.S. Pat. Nos. 3,515,688, 3,856,713, 3,970,533 and Polymer No. 13,253 (1972) describe elastomeric polyphosphazene copolymers. However, these materials exhibit a number of disadvantages which materially reduce their usefulness. For example, many of the copolymers disclosed therein contain fluorinated substituents which make them expensive. In addition, the solubility of such copolymers is rather limited. Moreover, it has been found in many instances that the elastomeric properties of the copolymers are dependent on the existence in the copolymer of minor but significant proportions of low molecular weight phosphazene oils. Thus, for example, copending application Ser. No. 876,384, filed on Feb. 8, 1978, and commonly assigned, discloses that the presence of relatively low molecular weight phosphazene oils in poly(aryloxyphosphazene) polymers, either as a deliberate addition to the polymer or as retained during preparation, provides for elastomeric characteristics in the polymer while the absence of such oils results in a leathery, difficult to process material. In addition, U.S. Pat. No. 3,943,088, also commonly assigned, discloses that the physical properties, particularly stress/strain, elongation and low temperature flexibility, of poly(fluoroalkoxyphosphazenes) are dramatically improved by the addition of relatively low molecular weight phosphonitrilic fluoroalkoxides (oligomers or cyclics).

As disclosed in the aforementioned copending application and U.S. Pat. No. 3,943,088, the addition of such low molecular weight phosphazene oils to the polyphosphazene polymers described therein does result in significant improvements in the elastomeric characteristics of the polymer. However, such a method of providing elastomeric properties also involves significant disadvantages. Thus, as described in the copending application, the relatively low molecular weight phosphazene oils along with high molecular weight polydichlorophosphazenes are produced during the thermal polymerization of —(NPCl$_2$)$_{\overline{n}}$ oligomers, where n=3 to 9. Accordingly, where it is desired to add such oils as a separate addition product to a polyphosphazene polymer, particularly a polyphosphazene polymer which has been derivatized by methods such as are described in, for example, U.S. Pat. Nos. 3,370,020, 3,515,688, 3,700,629, 3,702,833, 3,853,794, and 3,972,841; it is first necessary to separate the low molecular weight oily material from the high molecular weight polydichlorophosphazene, and then add it to the derivatized polyphosphazene polymer. As will be evident, it is, of course, possible to retain the low molecular weight oily material along with the higher molecular weight polydichlorophosphazene and then derivatize the mixed materials. However, this results in the production of derivatized polymer having mixed structures which may adversely effect the properties desired in the derivatized polymer.

In accordance with this invention, it has now been discovered that polyphosphazene copolymers having elastomeric characteristics can be prepared in the absence of relatively low molecular weight phosphazene oils, and without the aforementioned disadvantages by retaining some proportion of Cl in the form of P—Cl bonds (i.e., from about 0.4 to about 10 percent by weight based on the total weight of copolymer).

SUMMARY OF THE INVENTION

In accordance with the invention, poly(aryloxyphosphazene) copolymers are produced which are elastomeric in the absence of low molecular weight phosphazene oils employed in the prior art. The elastomeric characteristics of the copolymers result from the presence in the copolymer of some proportions of chlorine in the form of P—Cl bonds.

The copolymers have randomly repeating units represented by the formulas:

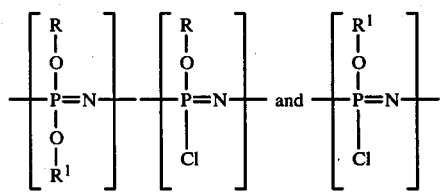

wherein R and R$^1$ may be the same or different and are selected from the group consisting of monovalent aryl radicals and substituted aryl radicals having the structure:

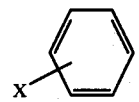

wherein X is a substituent selected from the group consisting of alkyl, alkoxy, aryl, aryloxy, amino and halogen substituted on any sterically permissible position on the phenyl group; and wherein the amount of Cl present in the form of P—Cl bonds is from about 0.4 percent to about 10 percent by weight based upon the total weight of copolymer.

As indicated, the copolymers of this invention may contain minor proportions of randomly distributed repeating units in addition to the repeating units described above. Illustrative of those additional units are:

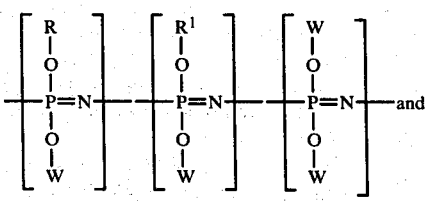

-continued

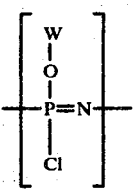

wherein W represents a group capable of a crosslinking chemical reaction such as an olefinically unsaturated, preferably ethylenically unsaturated, monovalent radical containing a group capable of further reaction at a wide range of temperatures (e.g., 25°–350° F.) and R and $R^1$ are as defined above.

These copolymers may be employed in applications such as coatings, foams and the like and depending on their specific compositions may be cured with sulfur, peroxides, or radiation.

DESCRIPTION OF THE INVENTION

As indicated, the present invention relates to copolymers having randomly distributed units represented by the above formulas. In this regard, it should be observed at this time that the term "copolymer" as employed throughout the specification and claims herein is utilized in the broad sense and is intended to include polymers formed from two, three, four or more monomers. Hence, the term "copolymer" as used herein encompasses not only the basic copolymer of two monomers, but also terpolymers, tetrapolymers, pentapolymers and so forth.

In the above formulas, R and $R^1$ as indicated, may be the same or different and are selected from the group consisting of monovalent aryl radicals and substituted aryl radicals having the structure:

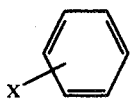

wherein X is a substituent selected from the group consisting of alkyl, alkoxy, aryl, aryloxy, amino and halogen substituted on any sterically permissible position on the phenyl group.

In the formula representing the substituted aryl radicals above, X may be alkyl such as methyl, ethyl, n-propyl, isopropyl, n-butyl, sec-butyl, t-butyl, 2-ethylhexyl and the like; alkoxy such as methoxy, ethoxy, isopropoxy, n-butoxy and the like; aryl; aryloxy such as phenoxy, naphthyloxy, 4-ethylphenoxy and the like; amino or halogen such as fluorine, chlorine, bromine or iodine.

One skilled in the art will readily recognize that steric hindrance will dictate the propriety of using relatively bulky groups in the ortho position in the phenyl ring since as set forth hereinafter copolymers containing such substituted groups are made by reacting a substituted alkali metal aryloxide with a chlorine atom attached to the phosphorus atom of the phosphorus-nitrogen polymer backbone. Desirably, groups which sterically inhibit this reaction should be avoided. Absent the foregoing proviso, the selection of various suitable R and $R^1$ groups can readily be made by one skilled in the art based on the present disclosure.

As indicated heretofore, in cases where the copolymers contain the additional reactive groups, W represents a monovalent radical containing a group capable of a crosslinking chemical reaction at a wide range of temperatures. (For example, 25°–350° F.)

W, when present in the copolymer is in fact a cure site radical or group. In general, virtually any of the cure site groups heretofore incorporated into polyphosphazene polymers may be employed as W in the copolymers of the present invention. Thus, the cure site groups described in U.S. Pat. Nos. 3,888,799; 3,702,833, and 3,844,983; which are hereby incorporated herein by reference may be utilized in these copolymers. Illustrative of W groups which may suitably be utilized are olefinically unsaturated monovalent radicals such as —OCH=CH$_2$, —OCR$^2$=CH$_2$, —OR$^3$CH=CH$_2$, —OR$^3$CF=CF$_2$, —OR$^3$R$^4$, and similar groups which contain unsaturation; wherein R$^2$ is any aliphatic or aromatic radical; wherein R$^3$ is alkylene or arylene and R$^4$ is vinyl, allyl, crotyl or the like. Of these groups, an especially preferred olefinically unsaturated group is ortho-allylphenoxy. These groups are capable of further reaction at a wide range of temperatures (for example 25°–350° F.) in the presence of free radical peroxide initiators, ultraviolet light, conventional sulfur curing or vulcanizing additives known in the rubber art or other reagents, often even in the absence of accelerators using conventional amounts, techniques and processing equipment. These groups may also be cured by means of high energy electrons. When curing with high energy electrons, dosages of 1 to 15 megarads depending on the thickness of the polymer stock are suitable.

Illustrative of free radical initiators which may be employed are benzoyl peroxide, bis(2,4-dichlorobenzoyl peroxide), di-tert-butyl peroxide, dicumyl peroxide, 2,5-dimethyl(2,5-di-tert-butyl peroxy) hexane, t-butyl perbenzoate and similar peroxides.

Illustrative of sulfur-type curing systems which may be employed are vulcanizing agents such as sulfur, sulfur monochloride, selenium, tellurium, thiuram disulfides, p-quinone dioximes, polysulfide polymers and alkyl phenol sulfides. The above vulcanizing agents may be used in conjunction with accelerators such as aldehyde amines, thio carbamates, thiuram sulfides, quanidines, and thiazols and accelerator activators, such as zinc oxide or fatty acids, e.g. stearic acid.

It is also possible to use as W in the above formulas, monovalent radicals represented by the formulas (1) —OSi(OR$^5$)$_2$R$^6$ and other similar radicals which contain one or more reactive groups attached to silicon; (2) —OR$^7$NR$^7$H and other radicals which contain reactive —NH linkages. In these radicals, R$^5$, R$^6$, and R$^7$ each represent aliphatic, aromatic and acyl radicals. Like the groups above, these groups are capable of further reaction at moderate temperatures in the presence of compounds which affect crosslinking. The presence of a catalyst to promote curing is often desirable.

In instances where the copolymers of the invention contain the reactive group W the ratio of (R+R$^1$): W groups present in the copolymer can vary considerably depending on desired properties. In general, the ratio of R+R$^1$): W groups can range from 50:50 to 99.9:0.1 with a preferred range being from 75:25 to 97:3.

As indicated, the copolymers of the invention in addition to R, R$^1$, and W groups contain some chlorine in the form of P—Cl bonds. As mentioned above, this is an extremely important feature of these copolymers. Thus, the presence of some chlorine in the form of P—Cl bonds imparts elastomeric characteristics to the copolymers without the necessity of employing low molecular weight phosphazene oils. The amount of chlorine present in the copolymers herein in the form of P—Cl bonds may range from 0.4 percent to about 10 percent, preferably from 0.4 percent to 6 percent, by weight based on the total weight of copolymer. It should be noted that in some instances amounts of chlorine down to about 0.2 percent may produce elastomeric characteristics in the copolymer.

The copolymers of the invention are prepared by reacting an oil-free poly(dichlorophosphazene) having the structure $-(NPCl_2)_{\overline{n}}$, wherein n is from 20 to about 50,000, with a mixture of compounds having the formulas $M(OR)_z$, $M(OR^1)_z$ and, if desired, $M(OW)_z$, wherein M is lithium, sodium, potassium, magnesium or calcium, z is equal to the valence of metal M, and R, $R^1$, and W are as defined above, in such a manner that a minor proportion of the chlorine originally present in the poly(dichlorophosphazene) is left unreacted.

Oil-free poly(dichlorophosphazenes) can be prepared by methods known in the art. Thus, for example, the poly(dichlorophosphazene) can first be prepared by thermally polymerizing a compound having the formula $-(NPCl_2)_{\overline{n}}$, where n is an integer from 3 to 9, in accordance with the procedure described in U.S. Pat. No. 3,370,020 to Allcock et al, which description is hereby incorporated herein by reference.

The polymeric product which is produced by thermal polymerization under appropriate conditions in accordance with the aforementioned Allcock et al process, is a mixed polymeric product having the formula $-(NPCl_2)-_n$ wherein n may range from 20 to about 50,000. Thus, the mixed product will ordinarily consist of a major proportion of a high molecular weight linear polymer, a minor proportion (i.e., 40 percent or less) of relatively low molecular weight phosphazene oils or oily material along with small amounts of unreacted cyclic trimer and tetramer and other cyclic oligomers.

An oil-free poly(dichlorophosphazene) can then be prepared by separating the relatively low molecular weight phosphazene oils along with unreacted trimer and tetramer or other cyclic oligomers from the high molecular weight linear polymer. This is accomplished by coagulation of the polymeric product from solution by addition of hexane or heptane in accordance with the purification process described in U.S. Pat. No. 3,755,537, issued Aug. 8, 1973, the disclosure of which is hereby incorporated herein by reference.

As indicated the resultant oil-free poly(dichlorophosphazene) is then reacted with a mixture of compounds having the formulas $M(OR)_z$, $M(OR^1)_z$ and if desired $M(OW)_z$, where M, R, $R^1$, W and z are as defined above, in such a manner that a minor proportion of the chlorine originally present in the polydichlorophosphazene polymer is retained.

Illustrative examples of alkali or alkaline earth metal compounds having the formulas $M(OR)_z$ and $M(OR^1)_z$ which may be employed in preparing the copolymers of the invention include among others: sodium phenoxide, potassium phenoxide, sodium p-methoxyphenoxide, sodium o-methoxyphenoxide, sodium m-methoxyphenoxide, lithium p-methoxyphenoxide, lithium o-methoxyphenoxide, lithium m-methoxyphenoxide, potassium p-methoxyphenoxide, potassium o-methoxyphenoxide, potassium m-methoxyphenoxide, magnesium p-methoxyphenoxide, magnesium o-methoxyphenoxide, magnesium m-methoxyphenoxide, calcium p-methoxyphenoxide, calcium o-methoxyphenoxide, calcium m-methoxyphenoxide, sodium p-ethoxyphenoxide, sodium o-ethoxyphenoxide, sodium m-ethoxyphenoxide, potassium p-ethoxyphenoxide, potassium o-ethoxyphenoxide, potassium m-ethoxyphenoxide, sodium p-n-butoxyphenoxide, sodium m-n-butoxyphenoxide, lithium p-n-butoxyphenoxide, lithium m-n-butoxyphenoxide, potassium p-n-butoxyphenoxide, potassium m-n-butoxyphenoxide, magnesium p-n-butoxyphenoxide, magnesium m-n-butoxyphenoxide, calcium p-n-butoxyphenoxide, calcium m-n-butoxyphenoxide, sodium p-n-propoxyphenoxide, sodium o-n-propoxyphenoxide, sodium m-n-propoxyphenoxide, potassium p-n-propoxyphenoxide, potassium o-n-propoxyphenoxide, potassium m-n-propoxyphenoxide, sodium p-methylphenoxide, sodium o-methylphenoxide, sodium m-methylphenoxide, lithium p-methylphenoxide, lithium o-methylphenoxide, lithium m-methylphenoxide, sodium p-ethylphenoxide, sodium o-ethylphenoxide, sodium m-ethylphenoxide, potassium p-n-propylphenoxide, potassium o-n-propylphenoxide, potassium m-n-propylphenoxide, magnesium p-n-propylphenoxide, sodium p-isopropylphenoxide, sodium m-isopropylphenoxide, calcium p-isopropylphenoxide, calcium m-isopropylphenoxide, sodium p-sec butylphenoxide, sodium m-sec butylphenoxide, lithium n-sec butylphenoxide, lithium m-sec butylphenoxide, lithium p-tert. butylphenoxide, lithium m-tert. butylphenoxide, potassium p-tert. butylphenoxide, potassium m-tert. butylphenoxide, sodium p-tert. butylphenoxide, sodium m-tert. butylphenoxide, sodium p-nonylphenoxide, sodium m-nonylphenoxide, and the like.

In preparing the copolymers of the invention, the reaction between the oil-free polydichlorophosphazene polymer and the alkali or alkaline earth metal compound is conducted in such a manner that a residual amount (as defined above) of chlorine in the form of P—Cl bonds is retained in the copolymer. This can be accomplished in several ways. Thus, for example, less than a stoichiometric amount of the alkali metal or alkaline earth compound can be used in the reaction. In other words, the amount of alkali metal or alkaline earth metal compound employed in the reaction is less than that required for complete reaction with the available chlorine atoms. Other methods include the use of a reaction temperature which is lower than that required to assure complete reaction with the available chlorine atoms or a reaction time which is shorter than that required for complete reaction. A combination of such conditions may also be used.

The above reaction is ordinarily carried out in the presence of a solvent. Examples of suitable solvents include diglyme, triglyme, tetraglyme, tetrahydrofuran (hereinafter THF), toluene and xylene. The amount of solvent employed is not critical and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The copolymer product resulting from this reaction is then treated to remove any excess base (e.g., Na$^+$, K$^+$, etc.) and to remove the salt which results from reaction of the chlorine atoms of the chloropolymer with the metal of the alkali or alkaline earth metal compounds. This can be accomplished by various means. Thus, for example, the excess base can be neutralized with carbon dioxide and water or an acid such as hydrochloric acid. The salts can be removed by precipitation and filtering or centrifugation or other known methods.

The next step in the process involves the recovery of the copolymer from the reaction medium. This is ordinarily accomplished by coagulation. Thus, a material which is a non-solvent for the copolymer is added to the reaction medium causing the copolymer to coagulate. Examples of materials which can be used for this purpose include hexane, pentane, heptane, octane or other hydrocarbon solvents, methanol, and the like.

The novel copolymers of the invention are soluble in specified organic solvents such as THF, benzene, xylene, toluene, dimethylformamide and the like. The copolymers may be utilized in films, coatings, foams, molding compositions and the like. They may, if desired, be blended with special purpose additives such as antioxidants, ultraviolet light absorbers, lubricants, dyes, pigments and fillers conventionally employed in the rubber and polymer arts.

The following examples are submitted for the purpose of further illustrating the nature of the present invention and are not to be construed as a limitation on the scope thereof. All parts and percentages in the examples and throughout the specification are by weight unless otherwise indicated.

The following examples (A through I) illustrate the preparation of alkali metal compounds for use in the reaction (i.e., derivatization) with the oil-free polydichlorophosphazene polymer.

EXAMPLE A

The distilled phenols (1.28 mole of phenol, 1.25 mole of p-ethylphenol and 0.139 mole of o-allylphenol) and sodium metal (2.67 mole) were weighed separately into bottles, mixed with tetrahydrofuran (THF) and capped in a dry-box. About 1000 ml of THF was added to the phenol mixture and 250 ml of THF was added to the sodium. The Na/THF mixture was added to a three-necked flask equipped with a stirrer, dropping funnel and $N_2$ purge line. Under $N_2$ purge, the mixture of phenols in THF were added dropwise with stirring, over about 2 hrs. at room temperature (exothermic reaction). After addition of phenols, the reaction mixture was stirred at room temperature overnight or at about 70° C. until the sodium has almost all reacted. Any unreacted sodium was then removed by means of filtration under $N_2$ atmosphere. A light yellow to brown solution was obtained. This solution was then transferred to a 28 oz. bottle and capped for derivatization.

EXAMPLE B

In this example, the procedure of Example A was substantially followed except that the phenols therein were replaced with 1.088 moles of phenol and 1.088 moles of p-ethylphenol and 2.16 moles of sodium were utilized.

EXAMPLE C

The procedure of Example A was substantially followed except that the phenols therein were replaced with 1.032 moles of phenol and 1.032 moles of m-cresol and 1.91 moles of sodium were utilized.

EXAMPLE D

The procedure of Example A was substantially followed except that the phenols therein were replaced with 1.66 moles of phenol, 1.97 moles of m-ethylphenol and 0.412 moles of o-allylphenol and 3.82 moles of sodium were utilized.

EXAMPLE E

The procedure of Example A was substantially followed except that the phenols therein were replaced with 3.96 moles of phenol and 3.82 moles of sodium were utilized.

EXAMPLE F

The procedure of Example A was substantially followed except that the phenols therein were replaced with 0.56 moles of phenol and 0.56 moles of p-ethylphenol and 1.12 moles of sodium were utilized.

EXAMPLE G

The procedure of Example A was substantially followed except that the phenols therein were replaced with 0.497 moles of phenol and 0.497 moles of p-ethylphenol and 0.99 moles of sodium were utilized.

EXAMPLE H

The procedure of Example A was substantially followed except that the phenols therein were replaced by 0.49 moles of phenol and 0.72 moles of p-ethylphenol and 1.21 moles of sodium were utilized.

EXAMPLE I

The procedure of Example A was substantially followed except that the phenols therein were replaced by 2.69 moles of phenol, 2.11 moles of p-ethylphenol and 0.362 moles of o-allylphenol and 5.17 moles of sodium were utilized.

EXAMPLE 1

To a pressure reactor equipped with stirrer, thermometer, heating means and nitrogen inlet was charged the phenoxide mixture of Example A. Then, 1.39 moles of an oil-free polydichlorophosphazene polymer (hereinafter chloropolymer) having the structure $-(NPCl_2)-_n$, where n is from 20 to 50,000, prepared substantially in accordance with the procedures set forth in U.S. Pat. Nos. 3,370,020 and 3,755,537 was dissolved in approximately 1400 milliliters of THF. The resultant polymer solution was added to the reactor over a period of about 20 to 40 minutes, following which 700 milliliters of THF was added to the reactor. The reaction mixture was then stirred at 300° F. for 24 hours and allowed to cool. Upon cooling, the resultant copolymer solution was neutralized with $CO_2$ and $H_2O$. The salts were then removed from the solution by the centrifugation method. The copolymer was then coagulated in methanol and dried.

The resultant copolymer had the following properties:

| | |
|---|---|
| Dilute Solution Viscosity (DSV) | 2.62 |
| % Gel | 0 |
| % Na (by weight) | 0.039 |
| % Cl (by weight) | 0.62–0.66 |
| Physical State | Elastomeric |

EXAMPLE 2

In this example, Example 1 was repeated with the exceptions that 1.21 moles of chloropolymer prepared as in Example 1 were employed and the phenoxide mixture of Example B was utilized in place of the phenoxide mixture of Example A.

The resultant copolymer had the following properties:

| DSV | 2.59 |
|---|---|
| % Gel | 0 |
| % Na | 0.022 |
| % Cl | 1.58 |
| Physical State | Elastomeric |

EXAMPLE 3

In this example, Example 1 was repeated with the exceptions that 0.86 moles of chloropolymer prepared as in Example 1 were employed, the phenoxide mixture of Example C was utilized in place of the phenoxide mixture of Example A, and the reaction was carried out at 160° F.

The resultant copolymer had the following properties:

| Tg | −17° C. |
|---|---|
| % Na | 0.061 |
| % Cl | 4.46 |
| Physical State | Elastomeric |

EXAMPLE 4

In this example, Example 1 was repeated with the exceptions that 1.72 moles of chloropolymer prepared as in Example 1 were employed, the phenoxide mixture of Example D was utilized in the place of the phenoxide mixture of Example A, and the reaction was carried out at 250° F.

The resultant copolymer had the following properties:

| DVS | 0.35 |
|---|---|
| % Gel | 0 |
| Tg | −34° C. |
| % Na | 0.14 |
| % Cl | 2.34 |
| Physical State | Elastomeric |

For comparative purposes, Example 4 was repeated with the exception that an excess of the phenoxide mixture of Example D was employed and the temperature of the reaction was maintained at 300° F. in order to react all of the available chlorine atoms on the polydichlorophosphazene polymer. The resultant copolymer containing only a small amount of residual P—Cl bonds was leathery in character.

EXAMPLE 5

In this example, Example 1 was repeated with the exceptions that 1.72 moles of chloropolymer prepared as in Example 1 were employed, the phenoxide of Example E was utilized in the place of the phenoxide mixture of Example A and the reaction was carried out at 250° F.

The resultant copolymer had the following properties:

| DSV | 0.85 |
|---|---|
| % Gel | 0 |
| Tg | −7° C. |
| % Na | 1.43 |
| % Cl | 6.00 |
| Physical State | Elastomer |

EXAMPLE 6

In this example, Example 1 was repeated with the exceptions that 0.70 moles of chloropolymer prepared as in Example 1 was employed and the phenoxide mixture of Example A was replaced with the phenoxide mixture of Example F.

The resultant copolymer had the following properties:

| DSV | 2.33 |
|---|---|
| % Gel | 33* |
| % Na | 0.014 |
| % Cl | 2.83 |
| Physical State | Elastomer |

*Probably not a true gel but a highly associated polymer (see Examples 11 and 12)

EXAMPLE 7

In this example, Example 1 was repeated with the exceptions that 0.67 moles of chloropolymer prepared as in Example 1 was employed and the phenoxide mixture of Example A was replaced with the phenoxide mixture of Example G.

The resultant copolymer had the following properties:

| DSV | N.M.* |
|---|---|
| % Gel | 67** |
| % Na | 0.026 |
| % Cl | 5.97 |
| Physical State | elastomer |

*not measured because of high gel value
**not a true gel but a highly associated polymer (see Examples 16 and 17)

EXAMPLE 8

In this example, Example 1 was repeated with the exceptions that 2.59 moles of chloropolymer prepared as in Example 1 was employed and the phenoxide mixture of Example A was replaced with the phenoxide mixture of Example I.

The resultant copolymer had the following properties:

| DSV | 1.52 |
|---|---|
| % Gel | 0 |
| Tg °C. | −13 |
| % Na | 0.0046 |
| % Cl | 0.80 |
| Physical State | Elastomer |

CONTROL

In this control example, the procedure of Example 1 was substantially repeated with the exception that the amount of oil-free polydichlorophosphazene polymer employed was 0.52 moles and the phenoxide mixture of Example H (i.e., excess phenoxide) was utilized in place of the phenoxide mixture of Example A.

The resultant copolymer had the following properties:

| DSV | 2.61 |
|---|---|
| % Gel | 0 |
| % Na | 0.25 |
| % Cl | 0.26 |

-continued

| Physical State | Leathery |
|---|---|

The following examples (9-21) illustrate the utility of certain of the copolymers of the invention in compositions suitable for wire coatings. In these examples, the compositions were prepared by mixing the copolymers and special purpose additives such as fillers, stabilizers, etc., in a Brabender mixer. In cases where a separate curing or crosslinking agent was employed, it was added to the composition on a cold 2-roll mill. In preparing the compositions for curing, they were sheeted to the desired thickness and cured in a closed mold utilizing the curing conditions specified below. Test formulations and test results are shown in the Examples.

EXAMPLES 9-10

In these examples, wire coating compositions were prepared in accordance with the above procedure. The compositions had the following formulations:

| Ingredients | | Parts by Weight | |
|---|---|---|---|
| | Ex. No. | 9 | 10 |
| Copolymer of Ex. 2 | | 100 | 100 |
| Hydral 705[1] (filler) | | 50 | 50 |
| Mg (OH)$_2$ (filler) | | 50 | 50 |
| Silane Base 6587[2] (processing aid) | | 10 | 10 |
| Zn 8-OH Quinolate (stabilizer) | | — | 0.5 |
| Irganox 1076[3] (antioxidant) | | — | 0.5 |
| Vulcup 40KE[4] (curative) | | 1.0 | 1.0 |
| | TOTAL | 211.0 | 212.0 |

[1] Hydral 705 is Al$_2$O$_3$ · 3H$_2$O (Alcoa)
[2] Silane base 6587 is a phenyl methyl vinyl siloxane compound used as a processing aid.
[3] Irganox 1076 is octadecyl 3-(3',5'-di-tert-butyl-4'-hydroxyphenyl) propionate used as an antioxidant
[4] Vulcup 40KE is α,α'-bis(tert-butylperoxy) diisopropyl-benzene on Burgess KE clay. 39.5-41.5% peroxide content.

The above formulations were mixed as set forth above, cured and tested for various properties. Test conditions and results are shown in Table I.

TABLE I

| Ex. No. | 9 | 10 |
|---|---|---|
| Cure 5' at 340° F. | | |
| Ring Tensile Properties | | |
| 10% Mod., psi | 43 | 43 |
| 50% Mod., psi | 387 | 326 |
| 100% Mod., psi | 1003 | 997 |
| Tensile, psi | 1108 | 1121 |
| Elong., % | 120 | 110 |
| Aged 70 hrs. at 300° F. | | |
| Ring Tensile Properties | | |
| 10% Mod. | Too Brittle to Test | 68 |
| 50% Mod. | for Ex. 9 | 512 |
| 100% Mod. | | 1447 |
| Tensile | | 1504 |
| Elong % | | 110 |

The above examples illustrate the effect of stabilizer and antioxidant on the properties of wire coating compositions. Thus, the aged properties of Example 10 which contains antioxidant and stabilizer are superior to those of Example 9 which does not contain these ingredients.

EXAMPLES 11-15

Wire coating compositions were prepared in accordance with the procedure set forth in Examples 9 to 10. Formulations and test results were as follows:

| | Parts by Weight | | | | |
|---|---|---|---|---|---|
| Ex. No. | 11 | 12 | 13 | 14 | 15 |
| Copolymer of Ex. 6 | 100 | 100 | — | — | — |
| Copolymer of Ex. 2 | — | — | 100 | 100 | 100 |
| Hydral 705 | 50 | 50 | 50 | 25 | 50 |
| Mg (OH)$_2$ | 50 | 50 | 50 | 75 | 50 |
| Silane Base 6587 | 10 | 10 | 10 | 10 | 10 |
| Irganox 1076 | 0.5 | 0.5 | 0.5 | 0.5 | 0.5 |
| Zn 8-OH Quinolate | 2 | 2 | 2 | 2 | 2 |
| Vulcup 40 KE | 1 | 1 | 1 | 1 | 1 |
| TOTAL | 213.5 | 213.5 | 213.5 | 213.5 | 213.5 |
| Cure 5' at 340° F. | | | | | |
| Ring Tensile Properties | | | | | |
| 10% Mod., psi | 31 | 29 | 36 | 38 | 32 |
| 50% Mod., psi | 560 | 244 | 307 | 340 | 321 |
| 100% Mod., psi | 614 | 816 | 1000 | 995 | 721 |
| 200% Mod., psi | 1266 | | | | |
| Tensile, psi | 1325 | 1443 | 1245 | 1281 | 1233 |
| Elong % | 220 | 175 | 125 | 130 | 160 |
| Aged 70 hrs. at 300° F. | | | | | |
| Ring Tensile Properties | | | | | |
| 10% Mod., psi | 88 | 74 | 87 | 115 | 57 |
| 50% Mod., psi | 505 | 495 | 663 | 703 | 428 |
| 100% Mod., psi | 1149 | 1122 | 1498 | 1451 | 1050 |
| Tensile, psi | 1399 | 1368 | 1530 | 1545 | 1288 |
| Elong, % | 167 | 130 | 103 | 110 | 135 |

EXAMPLES 16-17

Wire coating compositions were prepared as in Examples 9 and 10. Formulations and test results were as follows:

| | Parts by Weight | |
|---|---|---|
| Ex. No. | 16 | 17 |
| Copolymer of Ex. 7 | 100.0 | 100.0 |
| Hydral 705 | 50.0 | 50.0 |
| Mg (OH)$_2$ | 50.0 | 50.0 |
| Silane Base 6587 | 10.0 | 10.0 |
| Irganox 1076 | 0.5 | 0.5 |
| Zn 8-OH Quinolate | 2.0 | 2.0 |
| Vulcup 40 KE | 1.0 | 1.0 |
| TOTAL | 213.5 | 213.5 |
| Cure 5' at 340° F. | | |
| Ring Tensile Properties | | |
| 10% Mod., psi | 33 | 33 |
| 50% Mod., psi | 198 | 227 |
| 100% Mod., psi | 558 | 665 |
| 200% Mod., psi | 1081 | |
| Tensile, psi | 1140 | 1155 |
| Elong % | 225 | 170 |
| Aged 70 hrs. at 300° F. | | |
| Ring Tensile Properties | | |
| 10% Mod., psi | 61 | 76 |
| 50% Mod., psi | 361 | 427 |
| 100% Mod., psi | 793 | 941 |
| Tensile, psi | 1031 | 1113 |
| Elong % | 150 | 127 |

EXAMPLES 18-21

Wire coating compositions were prepared as in Examples 9 and 10. Formulations and test results were as follows:

| | Parts by Weight | | | |
|---|---|---|---|---|
| Ex. No. | 18 | 19 | 20 | 21 |
| Copolymer of Ex. 3 | 100.00 | 100.0 | 100.0 | — |
| Copolymer Control* | — | — | — | 100.0 |
| Al$_2$O$_3$ · 3 H$_2$O | 50 | 50 | 50 | 50 |
| Mg (OH)$_2$ | 50 | 50 | 50 | 50 |
| Silane Base 6587 | 10 | 10 | 10 | 10 |

-continued

| Ex. No. | Parts by Weight | | | |
|---|---|---|---|---|
| | 18 | 19 | 20 | 21 |
| Zn 8-OH Quinolate | — | 2 | 2 | 2 |
| Vulcup 40 KE | 1 | 1 | 1 | 1 |
| TOTAL | 211.00 | 213.0 | 213.0 | 213.0 |
| Cure 10' at 340° F. | | | | |
| 10% Mod., psi | 109 | 100 | 41 | 87 |
| 50% Mod., psi | 760 | 642 | 233 | 696 |
| 100% Mod., psi | — | 1555 | 673 | — |
| Tensile, psi | 1670 | 1755 | 1060 | 805 |
| Elong., % | 90 | 120 | 170 | 60 |
| Cure 20' at 340° F. | | | | |
| 10% Mod., psi | | 110 | 100 | |
| 50% Mod., psi | | 755 | 700 | |
| 100% Mod., psi | | — | 1510 | |
| Tensile, psi | | 1370 | 1510 | |
| Elong., % | | 75 | 100 | |

*This copolymer control is the control example which contains only 0.26% chlorine which is probably not present as P-Cl bonds, but is likely present as NaCl as evidenced by the sodium value of 0.25%. Since there is little or no P-Cl bonds left in the polymer, it is non-elastomeric (i.e. leathery) in nature.

One can note from the above formulations, that the copolymers containing residual chlorine, Ex. numbers 9 through 21 had physical properties which were superior to those of the control copolymer, i.e., Example 21, in which the copolymer contained very little or no residual P—Cl bonds.

The following Example (Ex. 22) illustrates the utility of a copolymer of the invention in a composition suitable for foams.

EXAMPLE 22

In this example, a foam composition was prepared from the following ingredients:

| Ingredients | Parts by Weight |
|---|---|
| Copolymer of Ex. 8 | 100.0 |
| Al$_2$O$_3$ . 3H$_2$O | 110.0 |
| Mg(OH)$_2$ | 55.0 |
| Pentaaerythritol tetraacrylate | 10.0 |
| Methyl phenyl vinyl siloxane | 10.0 |
| Zinc oxide | 4.0 |
| Stearic acid | 9.0 |
| Sodium bicarbonate | 15.0 |
| 4-4'-oxybis (benzene sulfonyl hydrazide) | 15.0 |
| Piperidinium pentamethylene dithiocarbamate | 2.0 |
| Zinc dibutyl dithiocarbamate | 0.5 |
| Zinc dimethyl dithiocarbamate | 0.5 |
| Sulfur | 7.0 |

The above ingredients were mixed, then precured in a positive pressure mold for 3 minutes at 230° F. and then removed from the mold and expanded in air circulating oven at 300° F. for ten (10) minutes. The resultant closed cell foam had a density of 7.5 pounds per cubic feet, had low flammability and generated very little smoke on burning.

We claim:

1. Oil-free elastomeric poly(aryloxyphosphazene) copolymers consisting essentially of randomly distributed repeating units represented by the formulas:

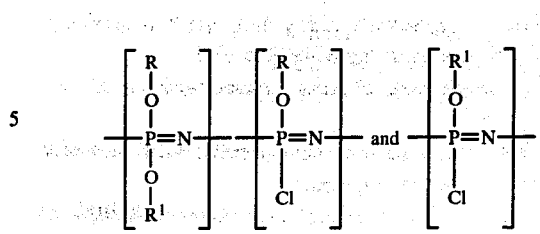

wherein R and R$^1$ may be the same or different and are selected from the group consisting of monovalent aryl radicals and substituted aryl radicals having the structure:

$$\underset{X}{\bigcirc}$$

wherein X is a substituent selected from the group consisting of alkyl, alkoxy, aryl, aryloxy, amino and halogen substituted on any sterically permissible position on the phenyl group and the amount of Cl present in the form of P—Cl bonds is from about 0.4 percent to about 10.0 percent by weight based on the total weight of copolymer.

2. The copolymers of claim 1 wherein the amount of Cl present in the form of P—Cl bonds is from 0.4 percent to 6.0 percent by weight based on the total weight of copolymer.

3. The copolymers of claim 1 wherein said copolymers additionally contain randomly distributed repeating units represented by the formulas:

$$\left[ \begin{array}{c} R \\ | \\ O \\ | \\ -P=N- \\ | \\ O \\ | \\ W \end{array} \right] \left[ \begin{array}{c} R^1 \\ | \\ O \\ | \\ -P=N- \\ | \\ O \\ | \\ W \end{array} \right] \left[ \begin{array}{c} W \\ | \\ O \\ | \\ -P=N- \\ | \\ O \\ | \\ W \end{array} \right] \text{and}$$

$$\left[ \begin{array}{c} W \\ | \\ O \\ | \\ -P=N- \\ | \\ Cl \end{array} \right]$$

wherein W represents a group capable of a crosslinking chemical reaction.

4. The copolymers of claim 3 wherein W is an olefinically unsaturated monovalent radical selected from the group consisting of —OCH=CH$_2$, —OCR$^2$=CH$_2$, —OR$^3$CH=CH$_2$, —OR$^3$CF=CF$_2$ and —OR$^3$R$^4$; wherein R$^2$ is an aliphatic or aromatic radical; wherein R$^3$ is alkylene or arylene and R$^4$ is vinyl allyl, or crotyl.

5. The copolymers of claim 3 wherein W is ortho-allylphenoxy.

6. The copolymer of claim 3 wherein W is a monovalent radical selected from the group consisting of —OSi(OR$^5$)$_2$R$^6$ and —OR$^7$NR$^7$H, wherein R$^5$, R$^6$, and R$^7$ each represent aliphatic, aromatic or acyl radicals.

7. The copolymers of claim 3 wherein the ratio of (R+R$^1$):W group is from about 50:50 to about 99.9:0.1.

8. The copolymers of claim 3 wherein the ratio of (R+R¹):W groups is from 75:25 to 97:3.

9. The copolymers of claim 1 cured with a peroxide curing agent.

10. The copolymers of claim 3 cured with a sulfur-accelerator type curing agent.

11. The copolymers of claim 3 cured with high energy electrons.

12. The copolymers of claim 3 cured with ultraviolet light.

13. The copolymers of claim 1 wherein R and R¹ are phenyl groups.

14. The copolymers of claim 1 wherein R is a phenyl group and R¹ is an alkyl substituted phenyl group.

15. The copolymers of claim 3 wherein R is a phenyl group and R¹ is an alkyl substituted phenyl group.

16. The copolymers of claim 3 wherein R is phenyl, R¹ is p-ethylphenyl and W is o-allylphenyl.

17. A wire coating composition comprising a blend of:

(a) an oil-free elastomeric poly(aryloxyphosphazene) copolymer consisting essentially of randomly distributed repeating units represented by the formulas:

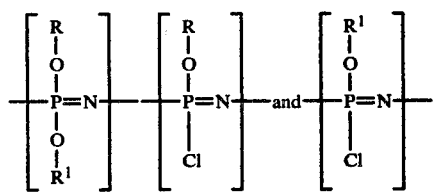

wherein R and R¹ may be the same or different and are selected from the group consisting of monovalent aryl radicals and substituted aryl radicals having the structure:

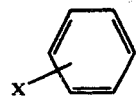

wherein X is a substituent selected from the group consisting of alkyl, alkoxy, aryl, aryloxy, amino and halogen substituted on any sterically permissible position on the phenyl group and wherein the amount of Cl present in the form of P—Cl bonds is from about 0.4 percent to about 10.0 percent by weight based on the total weight of copolymer, and (b) special purpose additives selected from the group consisting of stabilizers, antioxidants, fillers and curing agents.

18. The wire coating composition of claim 17 wherein said copolymer contains from 0.4 to 6.0 percent by weight of chlorine.

19. The wire coating composition of claim 17 wherein said copolymer (a) further contains randomly distributed repeating units represented by the formulas:

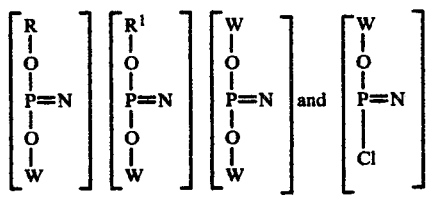

wherein W represents a group capable of a crosslinking chemical reaction.

20. The wire coating composition of claim 19 wherein W is an olefinically unsaturated monovalent radical selected from the group consisting of —OCH=CH₂, —OCR²=CH₂, —OR³CH=CH₂, —OR³CF=CF₂ and —OR³R⁴; wherein R² is an aliphatic or aromatic radical; wherein R³ is alkylene or arylene and R⁴ is vinyl, allyl, or crotyl.

* * * * *